United States Patent
Tobiasz

[11] Patent Number: 4,702,529
[45] Date of Patent: Oct. 27, 1987

[54] VEHICLE BRAKE PRESSURE PROPORTIONING VALVE

[75] Inventor: André Tobiasz, Epinay-sur-Seine, France

[73] Assignee: Automotive Products plc, Leamington Spa, England

[21] Appl. No.: 872,018

[22] Filed: Jun. 9, 1986

[30] Foreign Application Priority Data

Jun. 7, 1985 [FR] France .................. 85 08679

[51] Int. Cl.[4] .................. B60T 8/26
[52] U.S. Cl. .................. 303/6 C
[58] Field of Search .......... 188/349; 303/6 C, 22 R, 303/24 A, 24 C, 24 F

[56] References Cited

U.S. PATENT DOCUMENTS 3,245,221  4/1966  James et al.
3,412,555  11/1968  Lewis.
3,623,776  11/1971  Wellman .................. 303/6 C
3,727,990  4/1973  Vogt .................. 303/6 C
3,795,424  3/1974  Lewis.

FOREIGN PATENT DOCUMENTS 969901  9/1964  United Kingdom.
1081997  9/1967  United Kingdom.

Primary Examiner—Duane A. Reger
Attorney, Agent, or Firm—Solon B. Kemon

[57] ABSTRACT

A vehicle brake pressure proportioning valve in which a stepped plunger in a stepped bore shuttles in first and second opposite directions when inlet hydraulic pressure from a master cylinder increases to a predetermined value. The aforesaid shuttling causes a ball valve, in which the ball is loaded by a spring, to close and open a bore through the plunger leading to an outlet to the brake so that during the shuttling the outlet brake pressure increases at a lower rate than the inlet pressure. Eventually the increasing inlet pressure attains another predetermined value sufficient to hold the ball valve closed against the spring loading so that the ball blocks the bore no matter which direction the plunger moves and thus the brake pressure cannot be increased any further.

11 Claims, 3 Drawing Figures

VEHICLE BRAKE PRESSURE PROPORTIONING VALVE

BACKGROUND OF THE INVENTION

This invention relates to a vehicle brake pressure proportioning valve.

Typically, a proportioning valve is fitted to the rear brake system of the vehicle and allows full master cylinder pressure to be transmitted to the rear brakes until a predetermined brake pressure is reached, whereupon the valve operates to allow only a proportion of further increments of master cylinder pressure to reach the rear brake.

A brake pressure proportioning valve is disclosed in British Patent Specification 2 065 806A in which continued increase in brake pressure is stopped when a predetermined rate of vehicle deceleration is attained to cause relative movement of a control mass.

SUMMARY OF THE INVENTION

An object of the invention is to provide a brake pressure proportioning valve which can be of relatively simple construction and can cut-off increase in brake pressure (independently of rate of vehicle deceleration) when a predetermined master cylinder pressure is applied to the valve.

According to the invention a vehicle brake pressure proportioning valve comprises a housing, said housing having an inlet port for connection to a driver-controlled source of fluid pressure, said housing having an outlet port for connection to one or more brakes of the vehicle, said housing being formed with a housing bore having a first bore portion and a second bore portion of greater diameter than the first bore portion, a proportioning valve plunger having a first plunger portion slidable in the first bore portion and a second plunger portion slidable in the second bore portion, the second plunger portion being of greater diameter than the first plunger portion, said plunger having on the first plunger portion a relatively small piston area and on the second plunger portion a relatively large piston area, said relatively small piston area being subject to inlet pressure from the inlet port and said relatively large piston area being subject to brake pressure at the outlet port, first resilient means applying a biasing load to the plunger in a direction opposing movement of the plunger under action of brake pressure, the plunger having a plunger bore for communicating the inlet port with the outlet port through the plunger, metering valve means comprising a valve member and a valve seat on the plunger, said valve member and plunger being arranged for movement one relative to the other for seating the valve member against the valve seat to close the plunger bore and for unseating the valve member to open the plunger bore, second resilient means for opposing seating of the valve member, said valve member being subject to inlet pressure which in the valve closed position acts on the valve member in opposition to the combined action of the second resilient means and brake pressure acting in an unseating direction on said valve member, and wherein under increasing inlet port pressure the plunger is movable against the biasing load to bring the metering valve means into an operating state in which the plunger shuttles to and fro with further increasing inlet pressure whereby relative movement between the plunger and the valve member successively closes and opens the metering valve means to allow metered flow through the metering valve means for increasing the brake pressure at a reduced rate, and wherein upon the inlet pressure increasing to a first predetermined value at which the brake pressure is at a lesser second predetermined value the force of the inlet pressure acting on the valve member exceeds the combined opposing force of the second resilient means and brake pressure acting on said valve member whereby the metering valve means is held closed to prevent further increase in brake pressure above substantially the second predetermined value as the inlet pressure increases above the first predetermined value.

Force transmitting means can be disposed in the plunger bore for transmitting force between the valve member and the second resilient means, said force transmitting means and said plunger are movable one relatively to the other, and said force transmitting means allowing hydraulic fluid flow through the plunger bore when the valve means is open.

The force transmitting means can provide a restriction on fluid flow through the bore to reduce pressure increasing surges in the brake pressure.

The valve member can be a ball.

The valve seat can be at an end of the plunger bore adjacent to the relatively small piston area.

BRIEF DESCRIPTION OF THE DRAWINGS

The invention will now be further described, by way of example, with reference to the accompanying drawings in which.

DETAILED DESCRIPTION OF EMBODIMENTS

Figure 1:
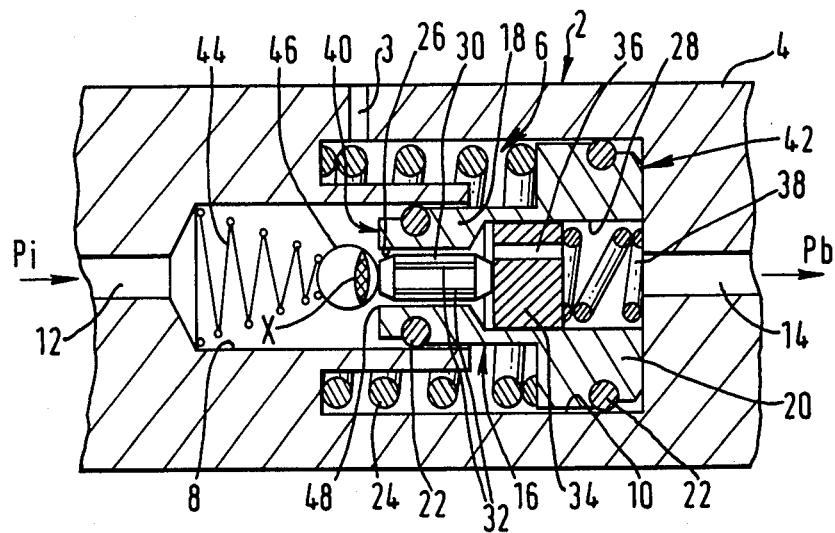
FIG. 1 is a diagrammatic sectional view of a fragment of one embodiment of a brake pressure proportioning valve formed according to the invention.

In the drawings like reference numerals refer to like or comparable parts.

Referring to FIG. 1 a vehicle brake pressure proportioning valve 2 has a housing 4 with an air vent 3 and a stepped housing bore 6 having a first bore portion 8 and a second bore portion 10 of greater diameter. An hydraulic fluid pressure inlet 12 supplied from, for example, a master cylinder opens into bore portion 8, and an outlet port 14 leading to, for example, a rear brake leads from bore portion 10. A stepped plunger 16, having a first plunger portion 18 and a larger diameter second plunger portion 20, is reciprocable in the stepped bore 6 in which the plunger is a fluid tight fit due its seals 22. The plunger 16 is resiliently loaded, for example, by an helical biasing spring 24 urging the plunger towards the outlet 14 to abut an end wall of the bore 6.

Plunger 16 is formed with an axial, stepped through plunger bore having a bore portion 26 opening to a larger diameter bore portion 28. A rod 30 is a relatively easy sliding fit in the bore portion 26 through which fluid can flow relatively freely between the rod and bore wall due to passages between longitudinal extending spaced ribs 32 (only two shown) on the rod exterior. A plunger 34 which is a sliding fit in bore portion 28 has a flow passage 36 therethrough and is for abutment on one side by the rod 30 and on the other side by resilient control means 38, for example, a helical spring.

In housing bore portion 8 the plunger 16 exhibits a relatively small annular piston area 40 surrounding the plunger bore portion 26 whereas in the wider housing bore portion 10 the plunger 16 exhibits a relatively large annular piston area 42 surrounding the plunger bore portion 28.

A spring 44 positions and urges a ball valve member 46 towards a valve seat 48 at the entrance to the plunger bore portion 26. The ball 46 and seta 48 form a metering valve.

Initially when the inlet pressure Pi is zero spring 24 pushes the plunger 16 as far to the right in FIG. 1 as possible, at the same time the control spring 38 is fully extended as in FIG. 1 and its stiffness braces force transmission means constituted by the plunger 34 and rod 30 so that the ball 46 is held off the valve seat 48.

Figure 3:
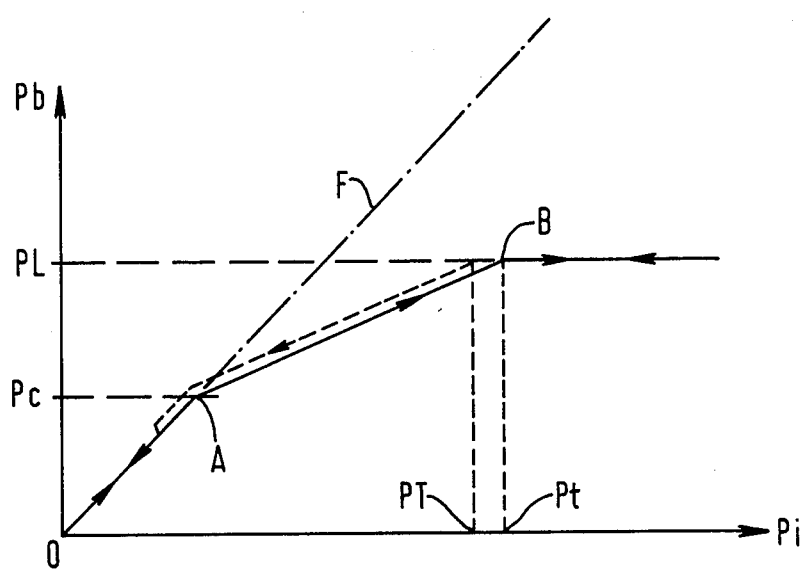
FIG. 3 is a graph of attained brake pressure plotted against inlet pressure using the valve in FIG. 1.

As the inlet pressure Pi initially increases, the brake pressure Pb increases at substantially the same rate as indicated by the graph section OA in FIG. 3. The knee point A occurs at the commencement of proportioning when Pi reaches a value Pc as predetermined by the force exerted by the preloaded spring 24. When the brake pressure rises to Pc the combined force exerted by the spring 24 and the inlet pressure Pi on the small piston area 40 is exceeded by the force exerted by the brake pressure Pb on the large piston area 42. The net effect is that the plunger 16 moves to the left in FIG. 1 relatively to the rod 30 so that valve 46, 48 closes the plunger bore 26, 28 by the seat 48 moving into abutment with the ball 46 seating on seat 48. As the inlet pressure Pi continues to increase as indicated by chain dot line F the force due to the fluid pressure on the small piston area 40 rises while that due to the brake pressure Pb on the larger piston area 42 does not because the valve 46, 48 is closed. Therefore, when the fluid force on the area 40 plus the force of spring 24 exceeds the force of the brake pressure Pb on the larger piston area 42, there is a net force on the plunger 16 moving it to the right in FIG. 1.away from the ball 46 held substantially stationary by the spring 38 and force transmission means 30, 36 relative to which the plunger 16 can move. The valve 46, 48 opens allowing an increase in brake pressure Pb which produces a net force on the plunger 16 moving it leftwards again in FIG. 1 to close the valve. Accordingly the plunger 16 shuttles to and fro closing and opening valve 46, 48 allowing the brake pressure Pb to increase at a lesser rate or as a proportion of inlet pressure Pi as indicated by graph section AB in FIG. 3 having a slope which is function of the ratio of the small piston area 40 to the large piston area 42.

Eventually the brake pressure Pb increases to a value PL represented at point B in FIG. 3 upon the inlet pressure increasing to value Pt. At this point, when the shuttling plunger 16 closes the valve 46, 48 there is now a sufficient net force exerted by the inlet pressure Pt on an area of the ball 46 (represented diagrammatically in FIG. 1 by cross-sectional area X) equal to the cross-sectional area of the bore portion 26 that this net force on the ball overcomes the stiffness of the control spring 38 and compresses the control spring when the plunger moves to the right in FIG. 1. Accordingly the valve 46, 48 continues to be held closed, and the closed valve and plunger 16 move to the right (as viewed in FIG. 1) simultaneously until the plunger is in the attitude shown, (it being understood that the spring 38 is compressed and the valve 46, 48 is closed). Therefore, the brake pressure Pb cannot now rise above the value PL.

The shuttling of the plunger 16 stops. The limit PL beyond which the brake pressure cannot be increased is predetermined by the stiffness of the control spring 38.

When the inlet pressure Pi drops, the brake pressure remains at value PL until the inlet pressure falls to a value PT which is lower than Pt due to the small piston area 40 being augmented by the effective area X on the ball 46 until the valve 46, 48 opens.

The passage 36 can be sized to provide some restriction to reduce pressure increasing surges being communicated from the inlet pressure side to the brake pressure.

In FIG. 1 the rod 30 and plunger 34 are separate and separable, however, the rod and plunger 34 may be attached or formed integral one with the other.

If desired, the mouth of bore portion 26 may be widened to a diameter greater than that of the ball 46, the valve seat being provided within the bore portion 26.

Figure 2:
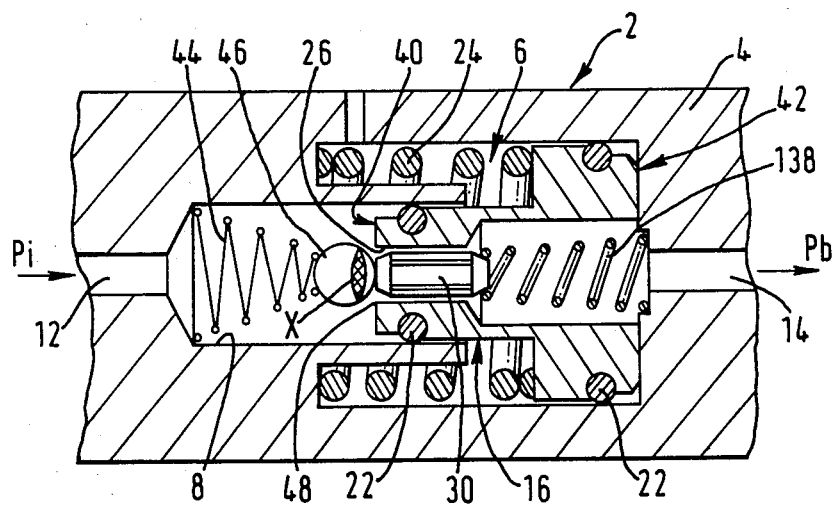
FIG. 2 is a similar view of a modification of the valve in FIG. 1.

In the modification in FIG. 2, the plunger 36 is omitted and a control spring 138 serving the same function as the spring 38 (FIG. 1) acts directly in the rod 30. In a further modification the rod 30 may be omitted, the control spring 138 being arranged for directly abutting against the ball 46.

The valve means used for closing the bore 26, 28 may be other than a ball valve, for example, the valve member may be a flap pivoted to the plunger 16.

I claim:

1. A vehicle brake pressure proportioning valve comprising a housing, said housing having an inlet port for connection to a driver-controlled source of fluid pressure, said housing having an outlet port for connection to one or more brakes of the vehicle, said housing being formed with a housing bore having a first bore portion and a second bore portion of greater diameter than the first bore portion, a proportioning valve plunger having a first plunger portion slidable in the first bore portion and a second plunger portion slidable in the second bore portion, the second plunger portion being of greater diameter than the first plunger portion, said plunger having on the first plunger portion a relatively small piston area and on the second plunger portion a relatively large piston area, said relatively small piston area being subject to inlet pressure from the inlet port and said relatively large piston area being subject to brake pressure at the outlet port, first resilient means applying a biasing load to the plunger in a direction opposing movement of the plunger under action of brake pressure, the plunger having a plunger bore for communicating the inlet port with the outlet port through the plunger, metering valve means comprising a valve member and a valve seat on the plunger, said valve member and plunger being arranged for movement one relative to the other for seating the valve member against the valve seat to close the plunger bore and for unseating the valve member to open the plunger bore, second resilient means for opposing seating of the valve member, said valve member being subject to inlet pressure which in the valve closed position acts on the valve member in opposition to the combined action of the second resilient means and brake pressure acting in an unseating direction on said valve member, and wherein under increasing inlet port pressure the plunger is movable against the biasing load to bring the metering valve means into an operating state in which the plunger shuttles to and fro with further increasing inlet pressure whereby relative movement between the plunger and the valve member successively closes and opens the metering valve means to allow metered flow through the metering valve means for increasing the brake pressure at a reduced rate, and wherein upon the inlet pressure increasing to a first predetermined value at which the brake pressure is at a lesser second predetermined value the force of the inlet pressure acting on the valve member exceeds the combined opposing force of the second resilient means and brake pressure acting on said valve member whereby the metering valve means is held closed to prevent further increase in brake pressure above substantially the second predetermined value as the inlet pressure increases above the first predetermined value.

2. A proportioning valve according to claim 1, in which force transmission means is disposed in said plunger bore for transmitting force between the valve member and the second resilient means, said force transmission means and said plunger are movable one relatively to the other, and said force transmission means allows hydraulic fluid flow through the plunger bore when the valve means is open.

3. A proportioning valve according to claim 2, in in which the said force transmission means provides a restriction on fluid flow through said bore for reducing pressure increasing surges in the brake pressure.

4. A proportioning valve according to claim 2, in which the said force transmission means is a rod.

5. A proportioning valve according to claim 4, in which said rod has one end acted on by said second resilient means and an opposite end acting on said valve member.

6. A proportioning valve according to claim 2, in which said force transmission means comprises a rod.

7. A proportioning valve according to claim 6, in which the force transmission means comprises at least said rod and a second plunger having one end acting on the rod and an opposite end acted on by the second resilient means, an end of the rod remote from said second plunger acts on said valve member, and said second plunger having at least one passage providing said restriction.

8. A proportioning valve according to claim 7, in which the said rod and second plunger are separate.

9. A proportioning value according to claim 7, in which said plunger bore has first and second communicating plunger bore portions, the second plunger bore portion is of greater diameter than the first plunger bore portion, and said rod is disposed in said first plunger bore portion and is of lesser diameter than said second plunger disposed in said second plunger bore portion.

10. A proportioning valve according to claim 1, in which said valve member is a ball.

11. A proporting valve according to claim 1, in which said valve seat is at an end of said plunger bore adjacent to said relatively small piston area.

* * * * *